D. C. BRAWLEY.
SAND-PUMP REEL.

No. 193,394. Patented July 24, 1877.

WITNESSES
John K. Smith
R. C. Wrenshall

INVENTOR
Dewitt C. Brawley
By Bakewell & Kerr
Attys.

UNITED STATES PATENT OFFICE.

DEWITT C. BRAWLEY, OF PETROLIA, PENNSYLVANIA.

IMPROVEMENT IN SAND-PUMP REELS.

Specification forming part of Letters Patent No. 193,394, dated July 24, 1877; application filed July 2, 1877.

*To all whom it may concern:*

Be it known that I, DEWITT C. BRAWLEY, of Petrolia, in the county of Butler and State of Pennsylvania, have invented a new and useful Improvement in Sand-Pump Reels; and I do hereby declare the following to be a full, clear, and exact description thereof, reference being had to the accompanying drawing, forming part of this specification, in which—

Figure 1:
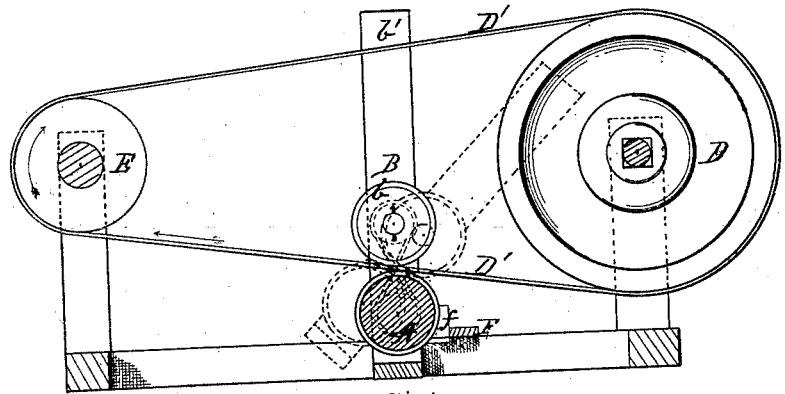
Figure 2:
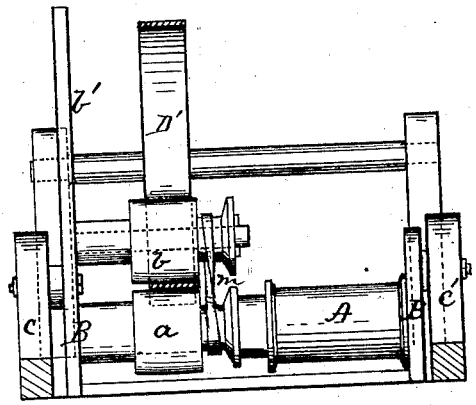
Figure 3:
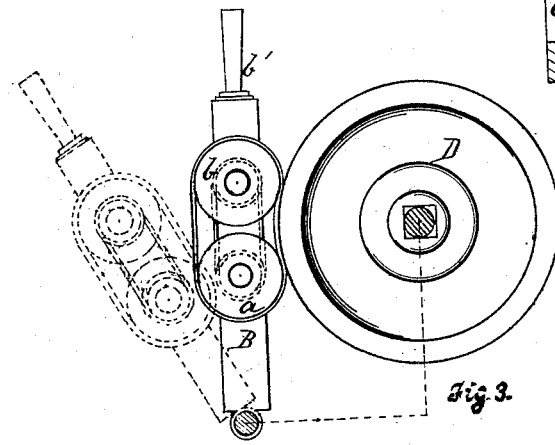

Figure 1 is a side elevation, partly in section, of a sand-pump reel embodying my invention. Fig. 2 is a front elevation of the same. Fig. 3 shows a modification in manner of driving the reel.

Like letters of reference refer to like parts wherever they occur.

My invention relates to the construction of and manner of applying power to sand-pump reels, and consists, first, in securing a suitable pulley to the shaft of the reel and mounting the whole in a swinging frame or bearing, so that the pulley may be pressed against the belt of the band-wheel or other suitable source of power, when it is desired to operate the reel; second, in combining with a sand-pump reel two or more pulleys connected by belt or equivalent gearing, one of said pulleys secured to the reel-shaft and the whole mounted or journaled in a swinging frame, whereby the position of the friction-pulleys may be changed to bring them in contact with the driver.

The present method of driving sand-pump reels commonly adopted is to journal the reel-shaft at one end in an adjustable bearing, and provide it with a beveled friction-wheel, which is brought in contact with the square face of the band-wheel by canting the reel and its shaft.

The common objections to such devices are, the uneven manner in which the band and friction-wheel are worn away, soon rendering both useless, and the labor and loss of power attendant on such devices.

The object, therefore, of the present invention, is to provide a means of applying the power to reels advantageously; also, to avoid the wear and tear of the band-wheel and reel-pulleys as much as possible and to simplify and cheapen the construction generally.

The mechanism hereinafter described is adapted to take the power either directly from the band-wheel or from the driving-belt, as desired.

I will now proceed to describe my invention so that others skilled in the art to which it appertains may apply the same.

A represents the reel or drum of a sand-pump mechanism, upon the shaft of which is secured a plain pulley, $a$. The shaft of the reel being journaled in a suitable frame, B, which is pivoted in housings C C', arranged in line with the band-wheel D.

In order to operate the pivoted or swinging frame B a suitable arm or lever, $b'$, is provided in the swinging frame B.

Over the shaft of the reel A or pulley $a$ thereon is a pulley, $b$, loose upon a short shaft, likewise fixed to said frame B.

D indicates the band-wheel and D' the driving-belt leading therefrom to the pulley E of the power-shaft.

When it is desired to take the power from driving-belt D', the swinging frame B is so arranged that the belt D' passes between the two pulleys $a\,b$ of the sand-reel mechanism, and the frame B is turned upon its pivots by lever $b'$ or equivalent device, so as to cause the pulleys $a\,b$ to bind upon the driving-belt.

In order to utilize the power from both pulleys they are connected on such occasions by a crossed belt, $m$, or cog-wheels may be interposed between the pulleys for the purpose specified.

In some instances it may be desirable to take the power directly from the band-wheel D, in which case the swinging frame B is arranged near to the band-wheel and at such height that the driving-pulleys, when rocked by the frame, will take against the periphery of the band-wheel, the two pulleys $a\,b$ being connected by a belt, as shown in Fig. 3, instead of a crossed belt.

Secured to the main frame is a cross-bar, F, with a buffer or brake, $f$, which operates to check the rotation of the pulleys $a\,b$ when they are released from contact with the band or band-wheel.

An efficient, though not so desirable, construction is obtained by omitting the pulley $b$ and its shaft, and swinging the frame B, so that the power is applied directly to the pulley of the reel-shaft.

The advantages of my improvements are simplicity and cheapness of construction, and the non-liability of defacing the band-wheel or reel-pulleys and consequent durability and certainty of action.

Having thus described my invention, what I claim, and desire to secure by Letters Patent, is—

1. The sand-pump reel, provided with a pulley secured to the shaft, the whole mounted in a swinging bearing or frame, substantially as and for the purpose specified.

2. The combination, with a sand-pump reel, of two pulleys connected by a belt or equivalent gearing, one of said pulleys mounted on the reel-shaft, the whole arranged in a swinging frame or bearing, substantially as and for the purpose specified.

In testimony whereof I, the said DEWITT C. BRAWLEY, of Petrolia, Butler county, and State of Pennsylvania, have hereunto set my hand.

DEWITT C. BRAWLEY.

Witnesses:
JOHN K. SMITH,
F. W. RITTER, Jr.